Figure 2:
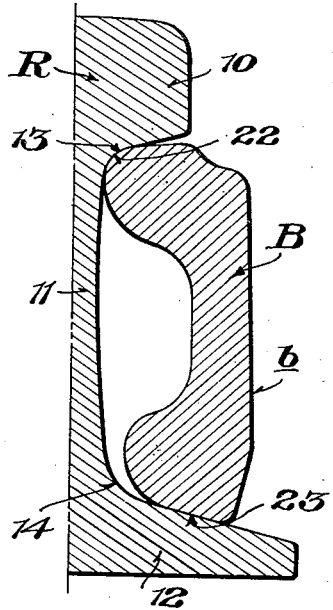
Figure 3:
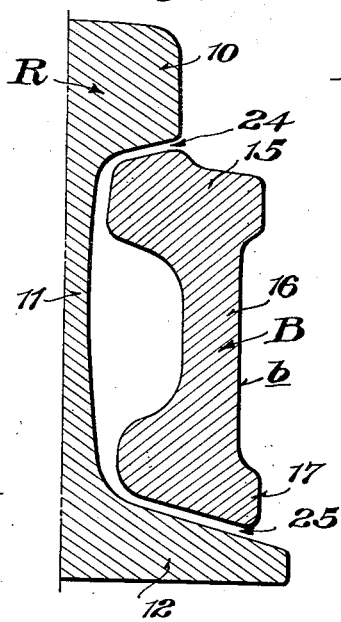
Figure 4:
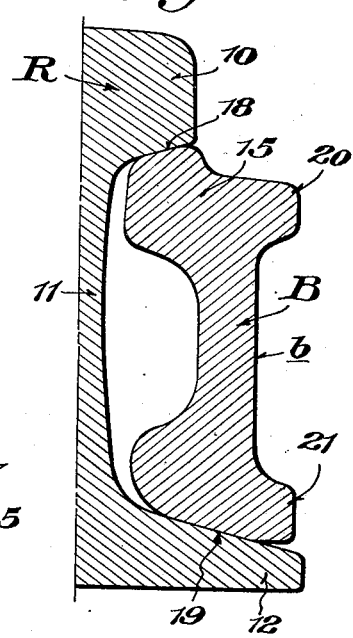
Figure 5:
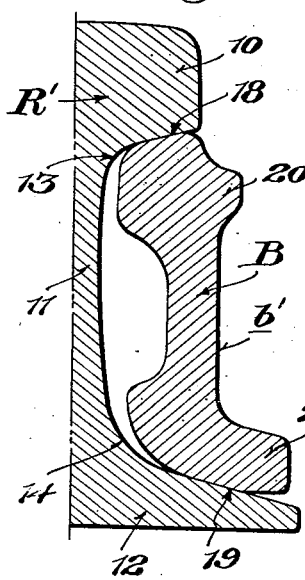
Figure 6:
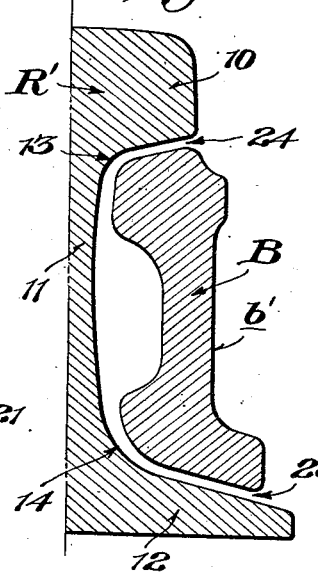

Nov. 30, 1937.   C. A. DISBROW   2,100,947
STEP JOINT
Filed April 21, 1936   2 Sheets-Sheet 1
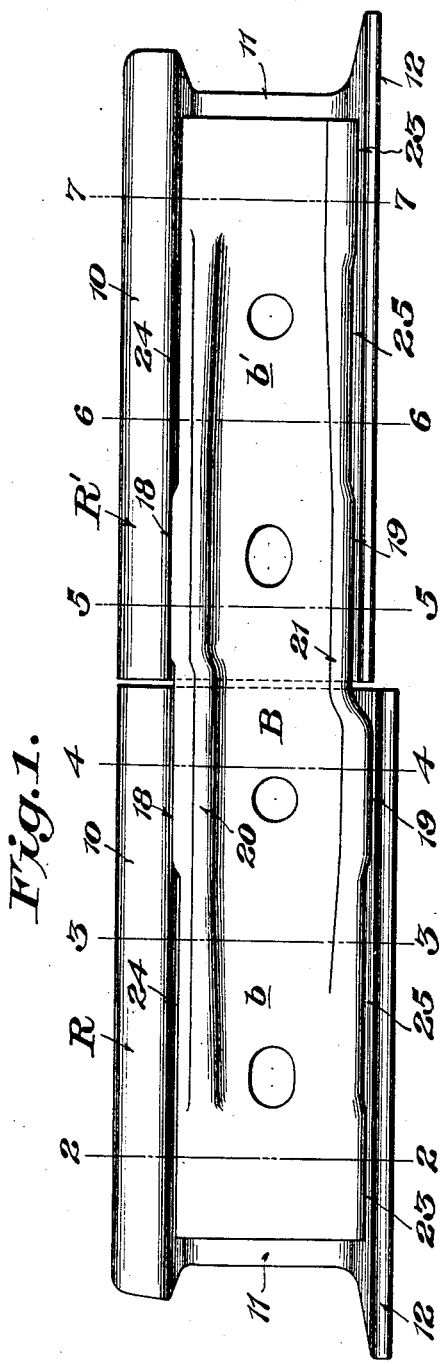
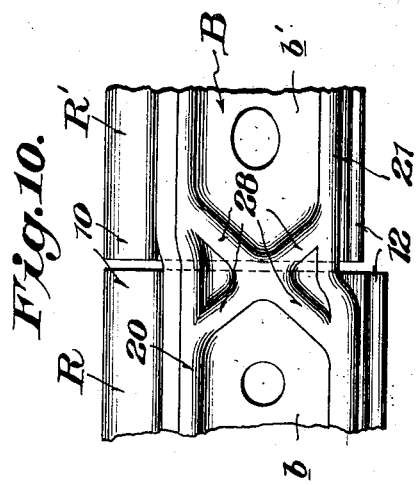
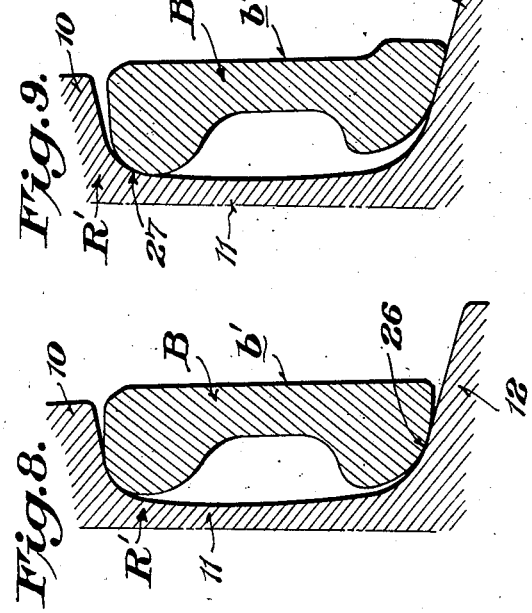
Inventor
Clarkson A. Disbrow,
By
Attorney Nov. 30, 1937.  C. A. DISBROW  2,100,947
STEP JOINT
Filed April 21, 1936  2 Sheets-Sheet 2

Inventor
Clarkson A. Disbrow,
By D. P. Wolhaupter
Attorney

Patented Nov. 30, 1937

2,100,947

UNITED STATES PATENT OFFICE 2,100,947

STEP JOINT

Clarkson A. Disbrow, New Rochelle, N. Y., assignor, by mesne assignments, to Poor & Company, a corporation of Delaware Application April 21, 1936, Serial No. 75,636

3 Claims. (Cl. 238—167)

This invention relates to improvements in step joints for connecting together the meeting ends of dissimilar railway rails, and has generally in view to provide a step joint possessing longer life and involving lesser production and maintenance costs than step joints of known designs.

In connecting together two dissimilar rails, either or both of which may be worn, as is usually the case, it is seldom, if ever, that the top surfaces of the two rails are brought into the same plane. This inherently is true because the splice bars, as articles of manufacture, must have definite dimensions and because it is seldom, if ever, that the splice bars will accurately fit both rails, due to the variable amount of wear to which either or both rails may have been subjected. Therefore, a step joint usually is characterized by one of the rails being more or less higher than the other rail. As a consequence, most step joints are subjected to exceptionally severe pounding by locomotive and car wheels passing thereover, which pounding is intensified if the natural wave motion of the rails is not permitted to pass substantially uninterruptedly through the joint.

Tests have proved that if the rails are very rigidly supported at their meeting ends and are flexibly supported at points spaced inwardly from their ends, their natural wave motion is substantially unhampered and the destructive effects of wheel pounding are materially reduced. Tests have proved, also, that the destructive effects of wheel pounding are further reduced if the rails are flexibly supported at points spaced inwardly from their ends, i. e. at the ends of the joints; and are unsupported, especially at their heads, between said points and their very rigidly supported extreme ends.

Accordingly, a special object of the present invention is to provide a step joint in which the rails are very rigidly supported at their extreme ends and are flexibly supported inwardly from their ends, more particularly at points spaced from their ends, or, in other words, at the ends of the joint, with lack of support between their ends and said points.

Another special object of the invention is to provide a splice bar which, when employed to connect two dissimilar rails, results in a step joint having the advantageous characteristics mentioned and which, in addition, is lighter in weight and cheaper and easier to produce than known types of step joint splice bars. In this connection a saving in metal is effected because of the forming of the bar at its ends to flexibly support the rails and because of the forming of the same between its middle and its ends to have clearance from the rails; also, because its end portions are, or may be, of generally lighter construction than its middle portion. Similarly, production costs are reduced because of the saving in the cost of dies, since no great amount of accuracy in the dimensions of the bar is necessary except throughout the relatively short length medial portion thereof which cooperates with the extreme end portions of the rails.

Another object of the invention is to provide a step joint in which the splice bar has novel loading cooperation at its ends with the rails, combined with rigid support of the rails at their ends, and in which the splice bar is, or may be, reinforced medially in a novel manner to assist in carrying head loads imposed on the rail ends to the bases of the rails at points spaced inwardly from the rail ends.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 1 is a side elevation of a step joint embodying the improved features of the present invention.

Figures 2, 3, 4, 5, 6 and 7 are cross sections on the lines 2—2, 3—3, 4—4, 5—5, 6—6 and 7—7 of Figure 1, respectively.

Figure 7:
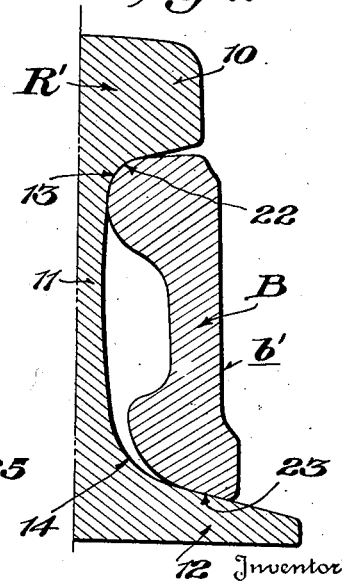

Figures 8 and 9 are views similar to Figure 7 illustrating alternative joint end structures; and Figure 10 is a fragmentary side elevation illustrating novel load distributing reinforcements at the middle of the splice bar.

Similar reference characters designate corresponding parts throughout the several figures of the drawings.

Referring to the drawings in detail, R and R' designate, generally, the high and the low rails, respectively of a dissimilar rail combination, and B designates, generally, a step joint splice bar constructed in accordance with the invention and connecting said rails together.

As usual, each rail includes a head 10, a web 11, a base 12 and head and base fillets 13 and 14, respectively, where the under side of the head and the upper side of the base merge into the web 11. Similarly, the splice bar B includes, as usual, the vertically or laterally, or both vertically and laterally offset half-length portions b and b' for cooperation with the rails R and R', respectively, and each of said half-length portions includes, as usual, a head 15, a web 16 and a base 17.

In the illustrative embodiment shown in Figs. 1 to 7 inclusive, the bar B preferably is of the short length, four bolt hole type and medially is of strong, heavy construction, being formed at the inner end of each of its two end sections b, b' to have broad, head fishing engagement with the under side of the related rail head, as indicated at 18, and to have broad, base fishing engagement with the upper side of the related rail base, as indicated at 19.

The head and base fishing portions 18 and 19 are of relatively short length and are designed to rigidly support only the extreme end portions of the rails. In other words, in practice the portions 18 and 19 are in the neighborhood of three inches in length or are of such length as to correspond approximately to the zones of maximum wear on the fishing surfaces of the rails at their ends, and in order that the rail ends may be rigidly supported by said portions 18 and 19, the medial portion of the bar is reinforced or strengthened by relatively heavy flanges or enlargements 20 and 21 of metal extending outwardly from the head and the base thereof, respectively.

According to the Figures 1 to 7 embodiment of the invention each half-length section b and b' of the splice bar is formed at its head, throughout a relatively short length outer end portion thereof, to have loading engagement at its upper, inner corner with the head fillet 13 of the related rail as indicated at 22, and clearance from the under side of the rail head. On the other hand, at its base, throughout a similar short length outer end portion thereof, each section b and b' is formed to have fishing engagement with the upper face of the related rail flange as indicated at 23. Between the portions 18 and 22, the head of each bar section b and b' is formed to have clearance both downwardly and outwardly from the related rail as indicated at 24, and between the portions 19 and 23 the base of each bar section is formed to have clearance both upwardly and outwardly from the related rail as indicated at 25.

The flanges or enlargements 20, 21 are relatively thick and heavy throughout the medial portion of the bar corresponding in length to the fishing portions 18 and 19, but outwardly from points approximately vertically alined with the outer ends of said fishing portions they are of progressively reduced thickness and finally merge into outer, flat end faces of the bar at points approximately alined with the inner ends of the portions 22 and 23. The end portions of the bar, as well as the portions thereof having the clearances 24 and 25 may, moreover, be of lesser thickness than the medial portion of the bar. In any event, the construction described obviously results in a step joint which is characterized by rigid support of the extreme rail ends and more or less flexible support of the rails at points spaced inwardly from their ends; i. e., at the ends of the joint where the splice bar has non-rigid headfree cooperation with the rails. These features, combined with the clearance features 24 and 25 between the medial and the end portions of the bar provide for substantially uninterrupted or unhampered passage of the natural wave motion of the rails through the joint and correspondingly reduce tendency of the medial fishing portions 18 and 19 of the joint to loosen under impact of loads passing from one rail end to the other. The rail ends thus are maintained high and rigid with respect to each other and the joint therefore possesses long life.

Instead of the outer ends of the bar sections b and b' having fishing engagement at their bottoms with the upper faces of the rail flanges, they may be formed to have basefree cooperation with the rails as indicated at 26 in Figure 8 of the drawings. This has the advantage of increasing the flexibility of the joint at its ends. Alternatively, the outer end portions of the bar may have fishing engagement at their bottoms with the rail flanges and at their tops may be formed to have normal headfree loading cooperation only with the bottom portions of the head fillets of the rails, as indicated at 27 in Figure 9 of the drawings. This has the advantage that the rails are free to flex downwardly under initial load but are progressively restrained against downward flexure as the load increases, due to the progressively increasing wedging action between the head fillets of the rails and rounded upper, inner corners of the bar until the head fillets finally seat against said rounded corners.

Figure 10 of the drawings illustrates that, if desired, the medial portion of the bar may be reinforced by a pair of diagonally extending, crossed ribs 28 of metal on the outer face of the bar, one connecting the rib 20 of the bar section b with the rib 21 of the bar section b' and the other connecting the rib 20 of the bar section b' with the rib 21 of the bar section b near the inner ends of said bar sections. These ribs not only impart increased stiffness to the medial portion of the bar, but definitely function to transmit head loads imposed on the rail ends to the bases of the rails at points spaced inwardly from their ends.

By the term "dissimilar rails" as used in the foregoing description and in the appended claims is meant any rail combination requiring that the splice bar B have its half-length portions b and b' either vertically and not laterally or laterally and not vertically, or both vertically and laterally offset. Inherently this is true of any pair of rails which, as new rails, differ in cross section. Also, it is true in the case of any pair of rails of originally the same cross section, one of which may be worn and the other unworn, or one of which may be worn a greater amount than the other.

When applied to a pair of rails either or both of which may have been used previously in a headfree joint, the present splice bar results in an exceptionally firm step joint, for the reason that one or both of the medial head fishing contact areas 18 thereof engage the unworn under side or sides of the head or heads of such rail or rails and afford new or unworn bearing contacts.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A compromise rail joint, including in combination with the dissimilar rails, a splice bar lying wholly inside of the outer edges of the rail flanges of both rails and having contact with the rails at its medial and end portions, said bar being provided throughout the medial portions of its head and foot with outer ribs tapering in cross-sectional thickness at the outer face of the bar web toward the ends of the latter, said bar tapering in cross-sectional thickness from its thicker medial portion to its thinner flexible end portions, and provided with rail head clearance at both sides of its medial portion.

2. A railway step joint comprising the dissimilar rails and the splice bar having fishing cooperation medially with the undersides of both rail heads, loading engagement at the upper inner corners of both ends with the head fillets of both rails and also clearance at both of its said ends from the undersides of the rail heads, the said bar having upper and lower reinforcing chords, tapering in cross-sectional thickness from its thicker medial portion to its thinner flexible end portions and provided with rail clearance at both sides of its medial portion.

3. A railway rail step joint comprising the dissimilar rails and the splice bar having end sections offset with respect to each other and cooperating with the respective rails, said bar having medial head and base fishing engagement with the under faces of the rail heads and the upper faces of the rail flanges, respectively, head-free cooperation at the ends of its head with the head fillets of the rails, loading cooperation at its bottom with the rails, clearances at its top from the rails at both sides of its medial portion, top and bottom ribs of metal on the outer face of the bar extending longitudinally of the bar and of greatest sectional area medially of the bar and of gradually reduced sectional area toward the ends of the bar, the said bar being of tapering cross-sectional area or thickness from its medial portion toward its end portions.

CLARKSON A. DISBROW.